US008259152B2

(12) United States Patent
Eriksson et al.

(10) Patent No.: US 8,259,152 B2
(45) Date of Patent: Sep. 4, 2012

(54) VIDEO CALL DISTRIBUTOR

(75) Inventors: Andreas Eriksson, West Milford, NJ (US); Ahsan Cheema, Somerset, NJ (US); Stuart Morris, South Plainfield, NJ (US); Ella Promislovskaya, Scotch Plains, NJ (US); Lou Chiorazzi, New York, NY (US); Cesar Manriquez, Caldwell, NJ (US)

(73) Assignee: Glowpoint, Inc., Murray Hill, NJ (US)

( * ) Notice: Subject to any disclaimer, the term of this patent is extended or adjusted under 35 U.S.C. 154(b) by 1290 days.

(21) Appl. No.: 11/963,527

(22) Filed: Dec. 21, 2007

(65) Prior Publication Data

US 2008/0186377 A1    Aug. 7, 2008

Related U.S. Application Data

(60) Provisional application No. 60/877,626, filed on Dec. 29, 2006.

(51) Int. Cl.
*H04R 7/14* (2006.01)

(52) U.S. Cl. .................................. 348/14.01; 348/14.02

(58) Field of Classification Search ............. 378/202.01; 348/14.01–14.16
See application file for complete search history.

(56) References Cited

U.S. PATENT DOCUMENTS

| 2001/0038690 | A1 | 11/2001 | Palmer et al. |
|---|---|---|---|
| 2002/0149670 | A1* | 10/2002 | Gerszberg et al. .......... 348/14.01 |
| 2003/0039345 | A1* | 2/2003 | Yang et al. ............... 379/201.01 |
| 2004/0081183 | A1 | 4/2004 | Monza et al. |
| 2004/0208303 | A1* | 10/2004 | Rajagopalan et al. ... 379/202.01 |

OTHER PUBLICATIONS

International Search Report mailed May 1, 2008, directed to counterpart international application No. PCT/US2007/89073; 3 pages.
International Preliminary Report on Patentability and Written Opinion, dated Jun. 30, 2009, directed to counterpart International Patent Application No. PCT/US2007/089073; 7 pages.

* cited by examiner

*Primary Examiner* — Brian Ensey
(74) *Attorney, Agent, or Firm* — Vedder Price P.C.

(57) ABSTRACT

A Video Call Distributor, including systems and methods, for distributing high quality real time video calls over an IP Packet-Based Wide Area Network and for routing those calls based on an ability to communicate and leverage existing routing rules and logic of a call management system, such as a traditional PBX-based.

28 Claims, 7 Drawing Sheets

VIDEO CALL DISTRIBUTOR

CROSS-REFERENCE TO RELATED APPLICATION

This application claims the benefit of U.S. Provisional Application Ser. No. 60/877,626, filed on Dec. 29, 2006.

FIELD OF THE INVENTION

This application is in the field of videoconferencing.

BACKGROUND OF THE INVENTION

Using traditional communication systems, users are able to place voice-only calls to one another. With the advent of real-time video conferencing technology, many users have determined that voice-only communication is not as user friendly or efficient as videoconferencing, and have begun to use video conferencing for both personal and professional communications. Accordingly, many companies desire to add video capability into their businesses. Unfortunately, in order to add video capabilities, it is necessary for a company to replace its existing voice-only system with a video-capable system. Such replacements are not only costly with regard to equipment, but also in regard to set up costs, training, system configuration and other associated costs. Furthermore, such a replacement renders the existing voice-only system obsolete and requires the replacement of most, if not all, of the voice-only system's peripheral devices, such as telephone handsets.

BRIEF SUMMARY OF THE INVENTION

The present invention provides a system and method which enable high quality real time video calls to be distributed over an IP Packet-Based Wide Area Network (hereinafter, "WAN") and for routing those calls based on an ability to communicate and leverage existing routing rules and logic of a call management system (hereinafter, "CMS") e.g., a traditional PBX-based.

According to an exemplary embodiment of the invention, a communication system may comprise a voice-only system configured to provide voice services; a video communication system configured to provide video communication services; and a video call distributor comprising, a plugin configured to transfer data between the video call distributor and the voice-only system, and a core configured to receive first commands from the voice-only system and to transmit second commands to the video communication system in accordance with the received commands.

According to a further exemplary embodiment of the invention, the core is further configured to establish a video call over the video communication system based on the first commands.

According to a further exemplary embodiment of the invention, the core is further configured to process the first commands prior to transmitting the second commands.

According to a further exemplary embodiment of the invention, the first commands are in a format compatible with the voice-only system, and the second commands are compatible with the video communication system.

According to a further exemplary embodiment of the invention, the voice-only system is a voice-only call management system, configured to receive incoming voice-only calls and to identify one of a plurality of agents based on user request information provided during the voice-only call.

According to a further exemplary embodiment of the invention, the user request information is provided via a DTMF signaling device.

According to a further exemplary embodiment of the invention, the DTMF device is a part of the voice-only call management system.

According to a further exemplary embodiment of the invention, the DTMF device is a telephone handset.

According to a further exemplary embodiment of the invention, a menu tree is utilized to provide the user request information.

According to a further exemplary embodiment of the invention, the plugin is a hardware component.

According to a further exemplary embodiment of the invention, the plugin is software component.

According to a further exemplary embodiment of the invention, the core has a distributed architecture.

According to a further exemplary embodiment of the invention, the voice-only system is a PBX.

According to a further exemplary embodiment of the invention, the video call distributor resides within a service provider grade IP Packet-Based WAN network.

According to a further exemplary embodiment of the invention, the video call distributor resides within a private enterprise IP LAN network.

According to a further exemplary embodiment of the invention, the plugin is configured to transfer data via either an XML or a JAVA call control protocol.

According to a further exemplary embodiment of the invention, the voice-only system is configured to receive the first commands from a voice-only telephone.

According to a further exemplary embodiment of the invention, the video call distributer is configured to transfer data between the video communication system and a plurality of voice-only systems.

According to a further exemplary embodiment of the invention, each of the plurality of voice-only systems has a different format.

According to a further exemplary embodiment of the invention, the core is configured to determine a recipient of the video call based on a skills-based routing mechanism.

According to an exemplary embodiment of the invention, a video call system for providing video communication may comprise, a voice-only call system configured to provide voice services; a video communication system configured to provide video communication services; a plugin configured to transfer data between the video communication system and the voice-only call system, and a core configured to receive first commands from the voice-only call system and to transmit second commands to the video communication system in accordance with the received commands.

According to a further exemplary embodiment of the invention, the core is further configured to establish a video call over the video communication system based on the first commands.

According to a further exemplary embodiment of the invention, the core is configured to determine a recipient of the video call based on a skills-based routing mechanism.

According to a further exemplary embodiment of the invention, the voice-only call system is a voice-only call management system, configured to receive incoming voice-only calls and to identify one of a plurality of agents based on user request information provided during the voice-only call.

According to a further exemplary embodiment of the invention, a voice-only telephone is used to provide the first commands to the voice-only call system.

According to an exemplary embodiment of the invention, a video call distributor may comprise at least one plugin configured to transfer data between a video communication system and an at least one voice-only call system, and a core configured to receive first commands from the at least one voice-only call system and to transmit second commands to the video communication system in accordance with the received commands.

According to a further exemplary embodiment of the invention, the core is further configured to establish a video call based on input from the voice-only call system.

According to a further exemplary embodiment of the invention, the core is further configured to receive first commands from a plurality of voice-only call systems.

DETAILED DESCRIPTION OF THE INVENTION

Figure 1:
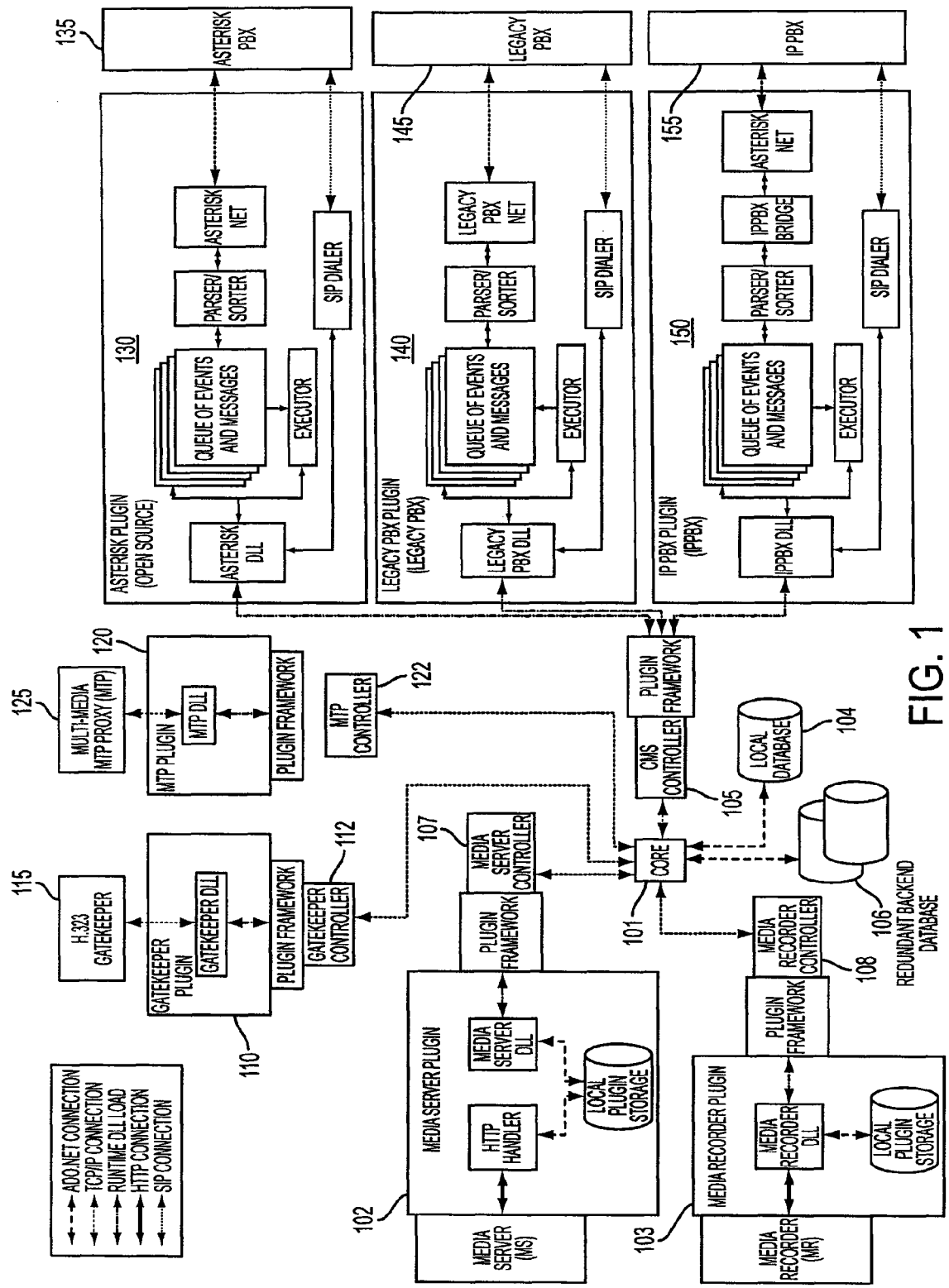
FIG. 1 depicts a logical diagram according to an exemplary embodiment of the invention.

Various embodiments of the invention, hereby known as the Video Call Distributor (VCD), include systems and methods for distributing high quality real time video calls over an IP Packet-Based Wide Area Network (WAN) and for routing those calls based on an ability to communicate and leverage existing routing rules and logic of a call management system (hereinafter, "CMS") e.g., a traditional PBX-based Automatic Call Distribution system (hereinafter, "ACD") serving multiple possible video endpoints (for example, a call center environment). The VCD integrates many features and services of traditional voice call distribution systems with video calls.

According to various aspects of the invention, core components and logic of a VCD system may reside within a service provider grade IP Packet-Based WAN network with global connectivity to other IP Packet-Based WAN networks and in some cases various private enterprise IP LAN networks. In another embodiment, those same core components and logic may be installed and/or reside within a private enterprise IP LAN network providing the same features and functionality as the WAN based system. According to various aspects of the invention, the VCD system may be designed to be multi-tenant and redundant, meaning the system can securely provide VCD services to multiple end-users of the service. The core may be constructed using distributive architecture. Because the system may be a network based system, the service is highly available with minimal or no down time due to any failures in the system itself. This design allows for the widest distribution of the service with minimal additions or changes for the end-user while providing interoperability with most legacy circuit-switched based or IP CMS system (for example Avaya or Nortel systems) in addition to available open-source IP-PBX systems (for example Asterisk) or smaller IP based call manager systems (for example a Cisco Call Manager).

According to various embodiments of the invention, a unique feature of the VCD system is a "Controller Plugin". According to various aspects of the invention, the Plugin enables video communication to be supplemented to any existing voice-only PBX system or other call routing devices (e.g. H.323 gatekeepers or SIP Proxy/Registrars, Call Managers, etc.). The Plugin may operate by opening a communication channel with an existing PBX system via call control protocols, for example, but not limited to, XML or JAVA, depending on what the PBX or other similar system supports. This communication may entail the passing of end-user data by the VCD Core (see FIG. 4) via a Plugin to the CMS system to determine call handling based on the CMS's existing skills-based routing logic. The CMS may then respond back to the VCD system with routing instructions as to where and/or what agent to send the video call to. According to various embodiments of the invention, the system may allow video communication to be added to any existing CMS or similar call distribution system and may negate the need for end-users to "fork-lift" their existing call center platforms in order to add video communication.

According to various embodiments of the invention, another unique feature of the invention is that call control (for example answering, hold, transfer) is achieved using an existing call center agent phone-set or a similar device. This allows the call center agents the ability to answer both audio and video calls using the same call control mechanism (which may be a phone-set) which reduces the need to add additional hardware and/or resources when adding video capability while maximizing agent productivity.

According to various embodiments of the invention, an additional function of the VCD platform may be the ability to record and store a two-way video session between a caller and a call center agent. According to various aspects of the invention, recordings can be stored for identification and confirmation purposes or may be played back and/or used at a later time for additional training purposes.

According to various embodiments of the invention, an additional feature of the invention is that the infrastructure of the VCD core may enable the VCD to be protocol and media agnostic. The VCD may interoperate with most IP based multimedia devices in addition to interoperating with most Legacy or IP CMS systems (e.g. Avaya, Nortel, Asterisk, etc.). Various embodiments of the invention may leverage a number of standards based multimedia protocols, including, but not limited to, H.323 and SIP (RFC3261 compliant) and their sub-standards. The VCD may leverage most, if not all, video and audio codecs supported by the majority of current and legacy videoconferencing devices including H.264, H.263, H.261 (video compression algorithms), MPEG4, G.722, G.722.1, G.728, G.711 (audio compression) in addition to security protocols (e.g. H.235 AES 128-bit encryption), data sharing/collaboration (H.239, T.120), and multimedia firewall traversal (H.460, ICE, TURN, STUN). The VCD may also make use of call control protocols including, but not limited to, XML, Java, and HTTP. According to various embodiments of the invention, the VCD core may be programmed to run on various systems, such as, but not limited to, Microsoft Server 2003® OS and Microsoft SQL® Database. Further embodiments of VCD may be programmed utilizing other operating systems (for example Linux) and/or other database platforms (for example Oracle). Additionally, multimedia devices such as a H.323 Gatekeeper, Multimedia Control Unit (MCU), Media Server, and Content Streaming Devices may be incorporated into the VCD architecture.

According to various embodiments of the invention, the VCD architecture may manage and/or render both Standard and High Definition video resolutions (QCIF-HD1080P) in addition to narrowband audio codecs (e.g. G.729) and wideband audio codecs (e.g. MPEG4). Resolution and audio quality produced is only limited by the multimedia codecs used to generate and receive calls through the VCD system.

According to various embodiments of the invention, the VCD may have the ability to interface and communicate with a CMS using, for example, XML protocol. In this way, the VCD may take advantage of the CMS's skills-based routing mechanisms and/or terminating phone system by transmitting the originating caller detail data to the CMS. When a call is received, the call recipient may be presented with an indicator on his phone-set similar to answering a voice call. When the call recipient "accepts" the call, it may trigger a process in the CMS to initiate a session with the VCD system using XML protocol with details of the available call recipient; these details may include the IP and/or e.164 number of the call recipient. The VCD system may take the data received from the CMS and initiate commands (e.g., XML commands) to the media server to transfer the queued call to the call recipient video system, at which time a video call between the originating caller and the call recipient could be established.

Upon connection of the video call, the call recipient may then utilize functions on the phone-set for hold, transfer, disconnect, and/or others. For example, when the "Hold" button is clicked, the VCD may issue commands (e.g., XML commands) to the video systems in the current call to mute the microphones and/or, at the same time, it could add a second call to a media server that may stream either a static video or motion video (for example, a commercial) to the call originator and/or the call recipient video systems. When the "Hold" button is clicked again, the streamed video may then be released and the microphones on both systems may be returned to normal (un-muted).

Technologies and Protocols

According to various embodiments of the invention, the VCD may be configured to use existing and approved ITU-T multimedia standards including, but not limited to, H.323, H.225, H.245, H.235, H.239, H.261, H.263, H.264, RTP/RTCP, SIP, and SNMP. The VCD may also use existing IETF standard protocols, including, but not limited to, Hypertext Transfer Protocol (HTTP), Java and Extensible Markup Language (XML).

According to various aspects of the invention, the systems and methods of the VCD may utilize typical LAN multimedia devices such as, but not limited to, H.323 gatekeepers, RFC3261 compliant SIP registrars, server hardware running the Microsoft Windows™ Server operating system, PC workstations with internet browsers, H.323 or SIP Media Servers, H.323/SIP Multimedia Control Units (MCU), and H.323 or SIP compliant video communications systems.

Logical System Description

FIG. 1 depicts a logical diagram according to an exemplary embodiment of the invention. The VCD may utilize a unique software based call control engine. In the exemplary embodiment of FIG. 1, a core 101 is connected to a local database 104 and a backend redundant database 106. The core may also be connected to a variety of endpoints The VCD may be able to communicate with a CMS (e.g., an existing call center PBX, such as the Lucent Definity®) via a Controller Plugin. That communication may be in any of multiple communication protocol including but not limited to XML, HTTP, and JAVA. In this way, a video call between a remote caller and a call recipient may be established to render high definition video in addition to encryption and data sharing while maintaining the CMS's functionality and reporting.

FIG. 1 is an exemplary diagram of a VCD system flow and its components with examples of Controller Plugins that the VCD Core 101 may communicate with. The following is a description of the various VCD components based on FIG. 1.

Core Network Components

Core 101—A primary function of the VCD server is to coordinate and pass messages between it and other VCD services. The VCD Core 101 may also be responsible for logging and synchronizing to the Service Provider Network master database. This is the primary service which all VCD services are dependent upon.

Media Server Plugin 102 functionality may be a service that receives a media slide (which may be motion or static) request from a media server. Once communication is established with the Core 101 service, it replies to requests and passes back a URL to a VXML request on a Media Server as exemplified in the following exemplary flow:

1. The Media Server Plugin 102 receives a request from a Media Server containing a source caller and a dialed number.
2. The Media Server Plugin 102 issues an event to its controller 107.
3. The Media Server Plugin 102 then waits a pre-determined time for a reply from the Core 101.
4. The Media Server Controller 107 receives the request event from the Media Server Plugin 102.
5. Information from the event is relayed to the Core 101.
6. The Core 101 then decides on a media slide URL based on qualifiers such as, but not limited to, tenant, skill, source and/or destination.
7. The Core 101 then sends slide or motion video information to the Media Server Controller 107.
8. The Media Server Controller 107 then invokes a function in the Media Server Plugin 102, passing the information from the Core 101.
9. The Media Server Plugin 102 then formulates a response and replies to the Media Server's request.

Media Recorder Plugin 103 functionality may be a service that records media from, for example, an MCU. Once communication is established with the Core 101 service, it listens for record requests from an MCU plugin as shown in the following exemplary flow:

1. A Media Recorder Plugin 103 receives a request from an MCU containing information about a call.
2. The Media Recorder Plugin 103 then issues an event to its Media Recorder Controller 108.
3. The Media Recorder Plugin 103 then waits a pre-determined time for a reply from Core 101.
4. The Media Recorder Controller 108 then receives the request event from the Media Recorder Plugin 103.
5. Information from the event is relayed to the Core 101.
6. The Core 101 determines where to store and what to name the recording based on criteria such as, but not limited to, tenant, skill, source and/or destination.
7. The Core 101 then sends information back to the Media Recorder Controller 108.
8. The Media Recorder Controller 108 then invokes a function in the Media Recorder Plugin 103, passing the information from the Core 101.
9. Media Recorder Plugin 103 then formulates a response and replies to the request of the MCU.

Local Database 104—A local storage that holds information related to the runtime environment of the core as well as provisioning details used by any connected Controllers, for example a CMS Controller 105. The data in the storage is kept in a synchronized state with the Redundant Backend Database 106 at all times.

CMS Controller 105—A service that loads CMS Plugins 130, 140, 150 at run-time and serves as the liaison between the Core 101 and Call Management System 135, 145, 155. It makes sure that any events coming from the Call Management System 135, 145, 155 is relayed to the Core 101 for proper handling.

Redundant Backend Database 106—A central storage device that is redundant to allow for high availability and to act as a hub when there more than one GVEC Platform is utilized in the architecture.

Examples of Controller Plugins

Gatekeeper Plugin 110 functionality is a service that may act as a "Transfer Agent". The Gatekeeper Plugin 110 may use a standard H.323 gatekeeper 115, such as, but not limited to, a Tandberg Gatekeeper. This Gatekeeper Plugin 110 may receive a request to transfer a call from the Core 101 service and report back either a success or failure. An exemplary call flow follows:

1. The Gatekeeper Plugin 110 initiates, for example, two telnet sessions with the gatekeeper 115 (this may utilize an HTTP or other data transmission protocol).
2. The telnet sessions may be kept alive by sending a carriage return every 30 seconds.
3. The first session may be used to issue commands and the second session may be used to listen for events from the gatekeeper 115.
4. The Core 101 then sends commands which may put a video call on hold, resume, transfer and/or disconnect to Controller, for example.
5. The Gatekeeper Controller 112 then issues the command through an interface (such as a .Net Interface) to the Gatekeeper Plugin 110.
6. The Gatekeeper Plugin 110 then uses the first session to issue a command to have the gatekeeper 115 transfer the call.
7. The Gatekeeper Plugin 110 then replies to the Gatekeeper Controller 112, which in turn relays to the Core 101 with the outcome of the transfer.
8. When the second session detects a disconnect the Gatekeeper Plugin 110 sends information about the disconnected party to the Gatekeeper Controller 112, which in turn relays to the Core 101.

Multimedia Transcoder Proxy (MTP) Plugin 120 (which may be an MCU) functionality is a service that may act as a "Transfer Agent". This service may receive a request to transfer a call from the Core 101 service and report back either a success or failure as exemplified in the following flow:

1. A video call is placed to the MTP 125.
2. The MTP 125 will then launch a second leg to the Media Server.
3. The MTP controller 122 then receives events from the Core 101, e.g. Hold, Resume, etc.
4. The MTP Plugin 120 then sends pre-populated xml data to the MTP 125 accordingly.
5. The MTP Plugin 120 then listens to events coming from MTP 125, these events may mainly include disconnect events.
6. The events are then relayed back to the Core 101.

Open Source CMS Plugin 130 functionality is a service that may communicate with an open source PBX system, such as, but not limited to an Asterisk PBX 135. The service may receive signals from both a PBX application as well as the Core 101 service to synchronize video calls with the supported PBX. This is exemplified in the flow as follows:

1. Events coming from the Asterisk PBX 135 are caught by the Open Source CMS Plugin 130.
2. A Parser/Sorter component parses the event data and confirms that this event is related to a call that was launched by the Open Source CMS Plugin 130.
3. Events that come through from the sorter may be stored in a FIFO queue to ensure they are processed in order.
4. An Executer component may de-queue the events, analyze the type of event, and act accordingly.
5. Events coming from the Core 101 are received by the Open Source CMS Plugin 130 and the Core 101 decides if a new phantom call should be created, or if any other action should be taken, depending on the event.
6. An SIP dialer component may be used to create a phantom call that ultimately will ring on an agent's phone.
7. Ex 1: The agent presses a 'Hold' button, an event is captured, parsed, filtered, matched up with internal data and added to the queue. The executer processes the event and notifies the controller, which relays the event to Core 101.
8. Ex 2: The PBX Controller receives a 'New Call Request' from the Core 101 and invokes the corresponding function in the Open Source CMS Plugin 130. The Open Source CMS Plugin 130 then determines whether any agents are logged in; if so, a phantom call is launched; if not, then that information is replied back to the Core 101 via the controller.

Legacy PBX Plugin 140 functionality is a service that may talk to a supported Legacy PBX 145, such as, but not limited to an Avaya PBX. The service may receive signals from both the PBX application as well as the Core 101 service to synchronize video calls with the supported PBX 145. The flow is as follows:

1. Events coming from the Legacy PBX 145 are caught by the Legacy PBX Plugin 140.
2. A Parser/Sorter component parses the event data and may confirm that an event is related to a call that was launched by the Legacy PBX Plugin 140.
3. Events that come through from the sorter may be stored in a FIFO queue to ensure they are processed in order.
4. An Executer component may then de-queue the event, analyze the type of event and act accordingly.
5. Events coming from the Core 101 may be received by the Legacy PBX Plugin 140 and it may decide if a new phantom call should be created, or if any other action should be taken, depending on the event.
6. An SIP dialer component may be used to create a phantom call that ultimately will ring on the agent's phone.
7. Ex 1: An agent presses a 'Hold' button, and an event is captured, parsed, filtered, matched up with internal data and added to the queue. The executer processes the event, notifies the controller which relays the event to Core 101.
8. Ex 2: The PBX Controller receives a 'New Call Request' from the Core 101 and invokes a corresponding function in the Legacy PBX Plugin 140. The Legacy PBX Plugin 140 then determines whether any agents are logged in, and if so, a phantom call is launched, if not, then that information is replied back to Core 101 via the controller.

Closed IP PBX Plugin 150 functionality may be a service that talks to an IP PBX 155, such as, but not limited to a Fonality PBX. Similar to the Open Source Plugin 130 as described above, the service may receive signals from both the PBX application as well as the Core 101 service to synchronize video calls with the supported IP PBX 155.

1. Events coming from the IP PBX 155 are caught by the IP PBX Plugin 150.
2. A Parser/Sorter component may parse the event data and confirm that the event is related to a call that was launched by the IP PBX Plugin 150.
3. Events that come through from the sorter may be stored in a FIFO queue to ensure they are processed in order.
4. An Executer component then may de-queue the event, analyze the type of event and act accordingly.
5. Events coming from the Core 101 are received by the IP PBX Plugin 150, which may then determine if a new phantom call should be created or if any other action should be taken, depending on the event.
6. An SIP dialer component may be used to create a phantom call that ultimately will ring on the agent's phone.
7. Ex 1: An agent presses 'Hold' button, an event is captured, parsed, filtered, matched up with internal data and added to the queue. The executer processes the event and notifies the controller, which relays the event to the Core 101.
8. Ex 2: PBX Controller receives a 'New Call Request' from the Core 101 and invokes a corresponding function in the IP PBX Plugin 150. The IP PBX Plugin 150 then determines whether any agents are logged in, and if so, a phantom call is launched, if not, then that information is replied back to Core 101 via the controller.

Call Flow Details

Figure 2A:
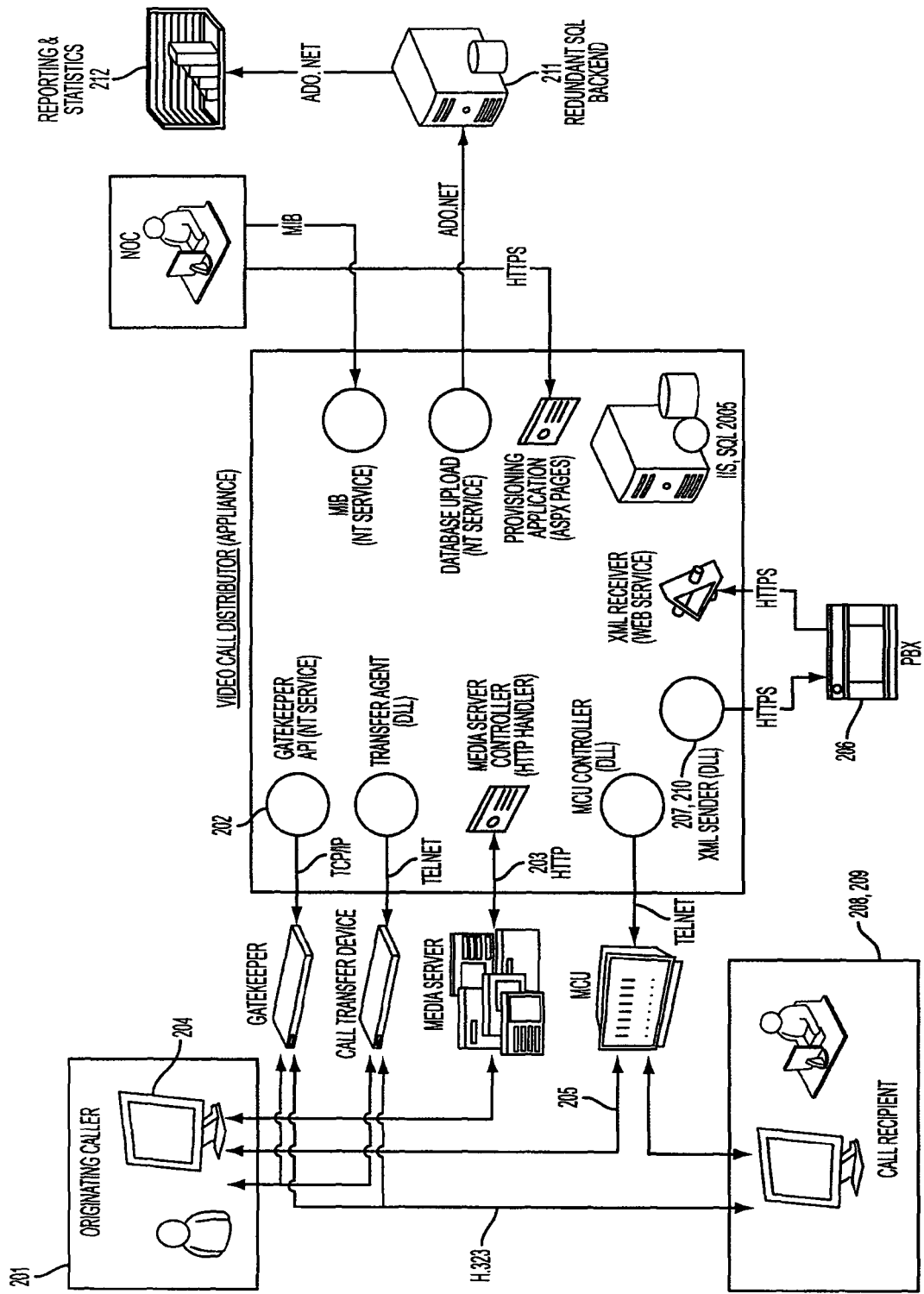
FIG. 2A depicts an exemplary embodiment of the invention depicting a system using a video-add on to a PBX.
Figure 2B:
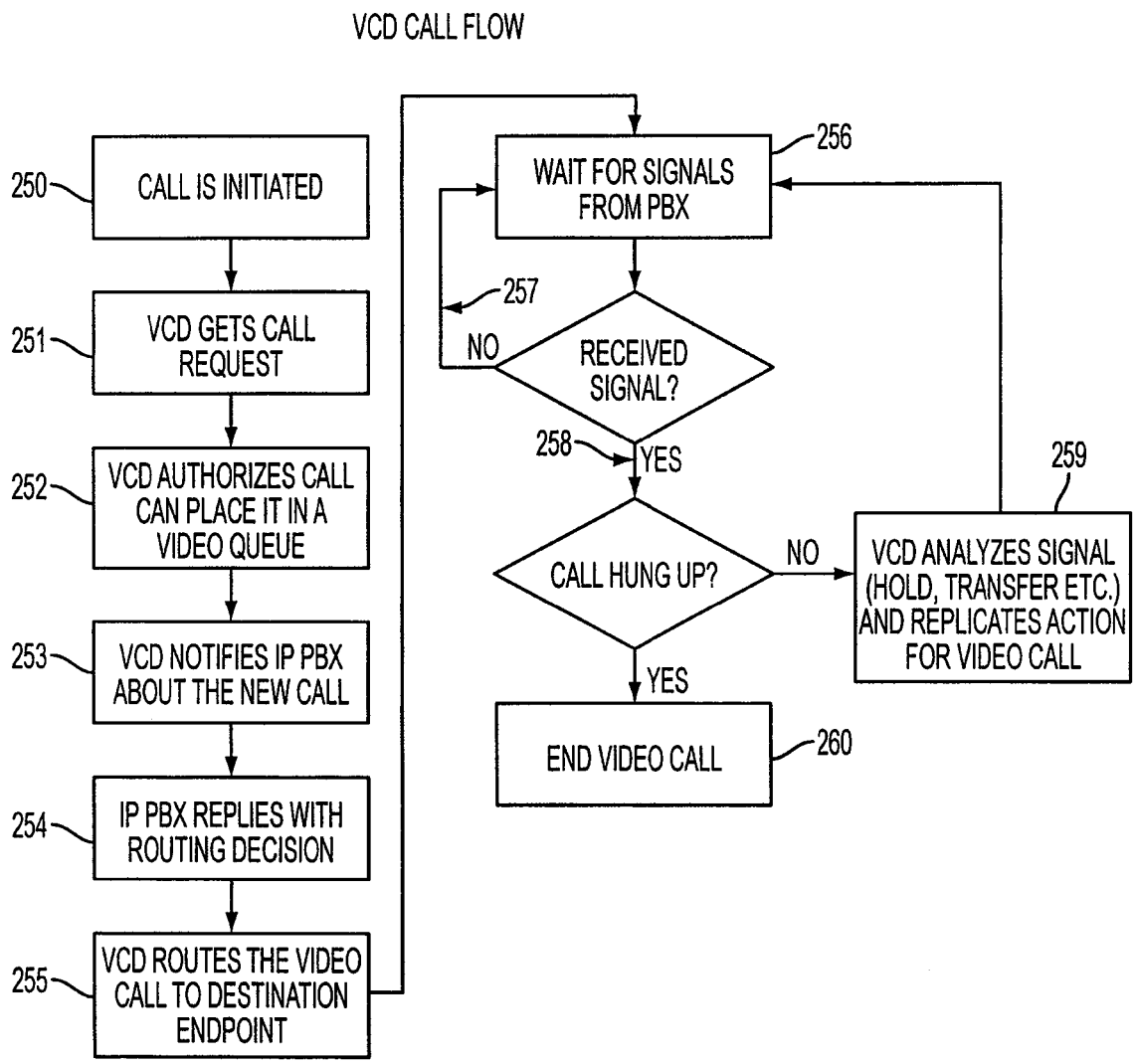
FIG. 2B depicts an exemplary embodiment of the invention depicting an exemplary VCD call flow.

FIGS. 2A and 2B depict exemplary call flow diagrams according to various embodiments of the invention. These examples in no way limit the application of the present invention.

The following is an exemplary call flow which depicts a role of the VCD in a video capable call system architecture as depicted in FIG. 2.

201—An Originating Caller initiates a video call using a device, such as, but not limited to, a remote control, a phone-set, or a touch screen.

202—Gatekeeper ("GK") API receives a call request from the H.323 gatekeeper.

203—GK API routes the call to a media server such that a menu tree may be utilized to determine an appropriate Call Recipient.

204—The Originating Caller selects at least one option from the menu tree using DTMF tones. The menu tree may contain various options to help the Originating Caller identify the services and/or type of information that the Caller desires. The menu tree may be a part of a voice-only system.

205—The Media Server routes the call to an MCU, which:
a. Creates a call using the MCU Controller's web service.
b. Adds a second participant in the form of an RTP stream.
c. Uses an XML Sender web service to notify a call center PBX that a new call has been initiated.

206—A PBX handles the skill-based routing, creates a "phantom call", and provides the e.164 number of an available agent.

207—An XML Receiver connects the Call Recipient to the video call using the MCU Controller.

208—During the call:
a. The Call Recipient controls the call via a phone-set (which may be a voice-only phone-set, and may be from a legacy voice-only system); events are sent to the XML Receiver.
b. The XML Receiver uses the MCU Controller and the XML Sender web services to synchronize the video call based on those events.

209—The Call Recipient hangs-up the phantom call using the phone-set (again, which may be a voice-only phone-set).

210—The XML Receiver receives a final event and disconnects the video call using the MCU Controller in response to the final event.

211—Some or all of the above processes and/or data may be recorded and/or stored in the SQL Backend.

212—Reporting and/or statistics may be generated and/or based on the logs stored in the SQL Backend.

VCD Call Flow

FIG. 2B depicts an exemplary VCD call flow diagram according to various aspects of the invention.

As shown in FIG. 2B, a call is initiated 250. The call may be initiated using any video-capable system. Example systems may include, but are by no means limited to: a personal console, such as a home video system; a remote videoconferencing system, which may be supplied in a user's workplace or by a third party vendor at a store; a video capable kiosk, which may be located in a convenient high traffic area, such as a mall or an up-scale grocery store; or a video terminal to assist customers, such as in proximity to a bank teller to assist with translation services or non-standard or irregular banking transactions.

The VCD receives a call request 251. The call request along with other data transmission may be transferred using any of a variety of connections and/or suitable protocols depending on both the data type and on the hardware utilized.

The VCD authorizes the call and places it in a video queue 252, and notifies an IP PBX that a new call is in the queue 253. The IP PBX makes a routing determination and responds to the VCD with the routing decision 254. The routing decision may be made with the assistance of a menu tree as described above.

The VCD then routes the video call to a destination endpoint 255 according to the determination made by the IP PBX. The VCD then waits for signals from the PBX 256. If no signal is received 257 the VCD continues to wait for a signal from the PBX 256. If a signal is received 258, the VCD then determines if one of the call participants has hung up. If the signal is not a "hang up" signal, the VCD analyses the signal to determine an appropriate action, and then performs that action on the video call 259. Accordingly, the VCD is able to use signals from a voice only hand-set such as a voice-only telephone and use those signals to control a video call. For example, if a user activates the transfer button on a voice-only phone, the VCD determines that the user wishes to transfer the video call and transfers the video call. It may most likely be transparent to the user that the VCD exists or is controlling the video call. This not only allows the user to remain comfortable using known hardware (such as a voice-only phone) having features the user is familiar with, but it also allows the user's employer to save the costs associated with replacing the known had-set with a new and/or different hand-set.

If the VCD receives a signal 258 and that signal is a "hang up" signal, the VCD ends the video call 260.

Example Applications

The exemplary VCD architecture (such as that depicted in FIG. 1) may interoperate with most, if not all, modern and legacy CMS systems by use of a unique "Control Plugin." The Control Plugin may be a custom software component that enables the core of the VCD architecture to communicate via standard control protocols, for example XML. Through the Plugin, the VCD core may communicate with a PBX for call routing instructions for the purpose of ensuring an originating video call is routed and connected to the correct call center agent phone and/or video terminal per the skills-based logic of the CMS system. Once connected, video and audio communication may be conducted via the agent's videoconference terminal. Call control (answer, hold, resume, transfer) may be accomplished utilizing an agent's existing phone-set. According to another embodiment, the video and/or audio connection may utilize a PC with GUI-based call control program. An additional embodiment of the invention may include various features, such as queue and forward mechanisms, as described in co-pending U.S. patent application Ser. No. 10/990,351 titled Systems and Methods for an Operator System Service. These examples in no way limit the application of the present invention.

Figure 3A:
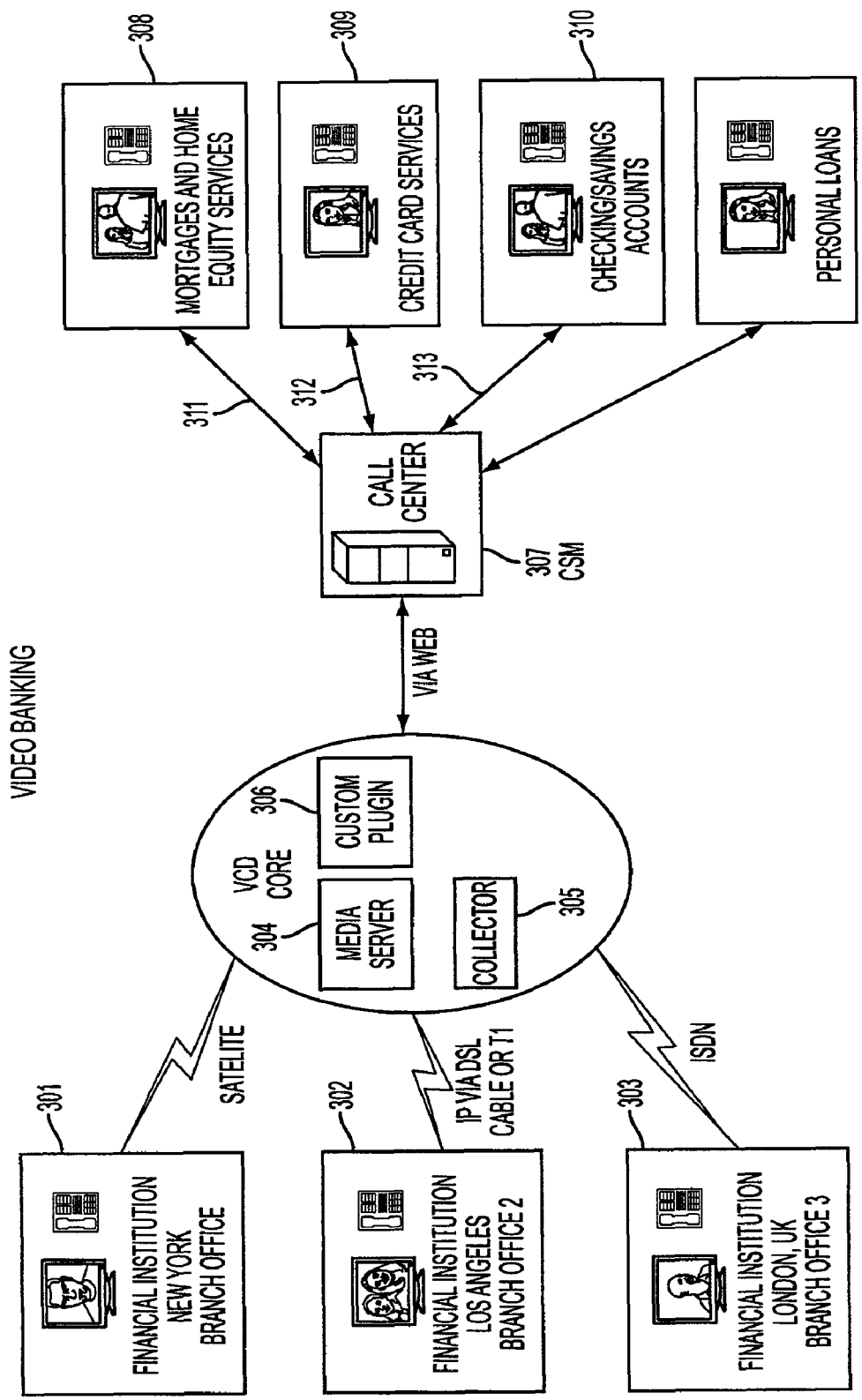
FIG. 3A depicts an exemplary embodiment of the invention, in which a banking customer may open a new checking account or apply for a loan utilizing a high definition (HD) capable video kiosk.

FIG. 3A depicts an exemplary embodiment of the invention in which a banking customer may open a new checking account or apply for a loan utilizing a high definition (HD) capable video kiosk. The video kiosk may connect the customer to a banking agent with a desired skill set over a secured real-time, HD video connection, even if the agent is located in a remote central site.

Figure 4:
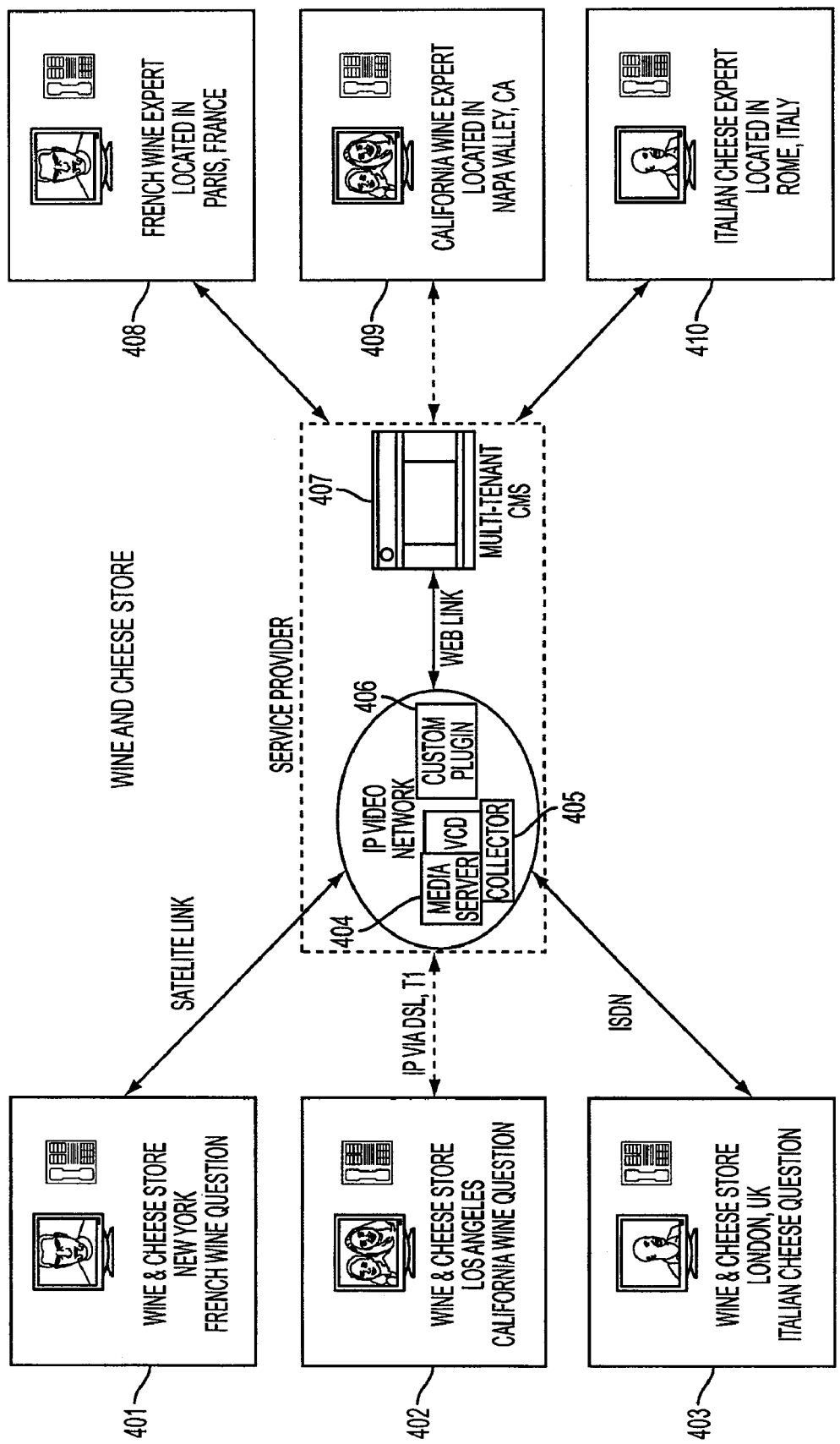
FIG. 4 depicts an exemplary embodiment of the invention in which gourmet food customers may select a subject from an in-store kiosk.

FIG. 4 depicts another aspect of the invention in which a gourmet food store customer may use an in-store video kiosk to speak with an available wine expert anywhere in the world (e.g., California or France) for wine advice. The user may then use the same kiosk to obtain cheese advice from an available expert in Wisconsin.

Figure 5:
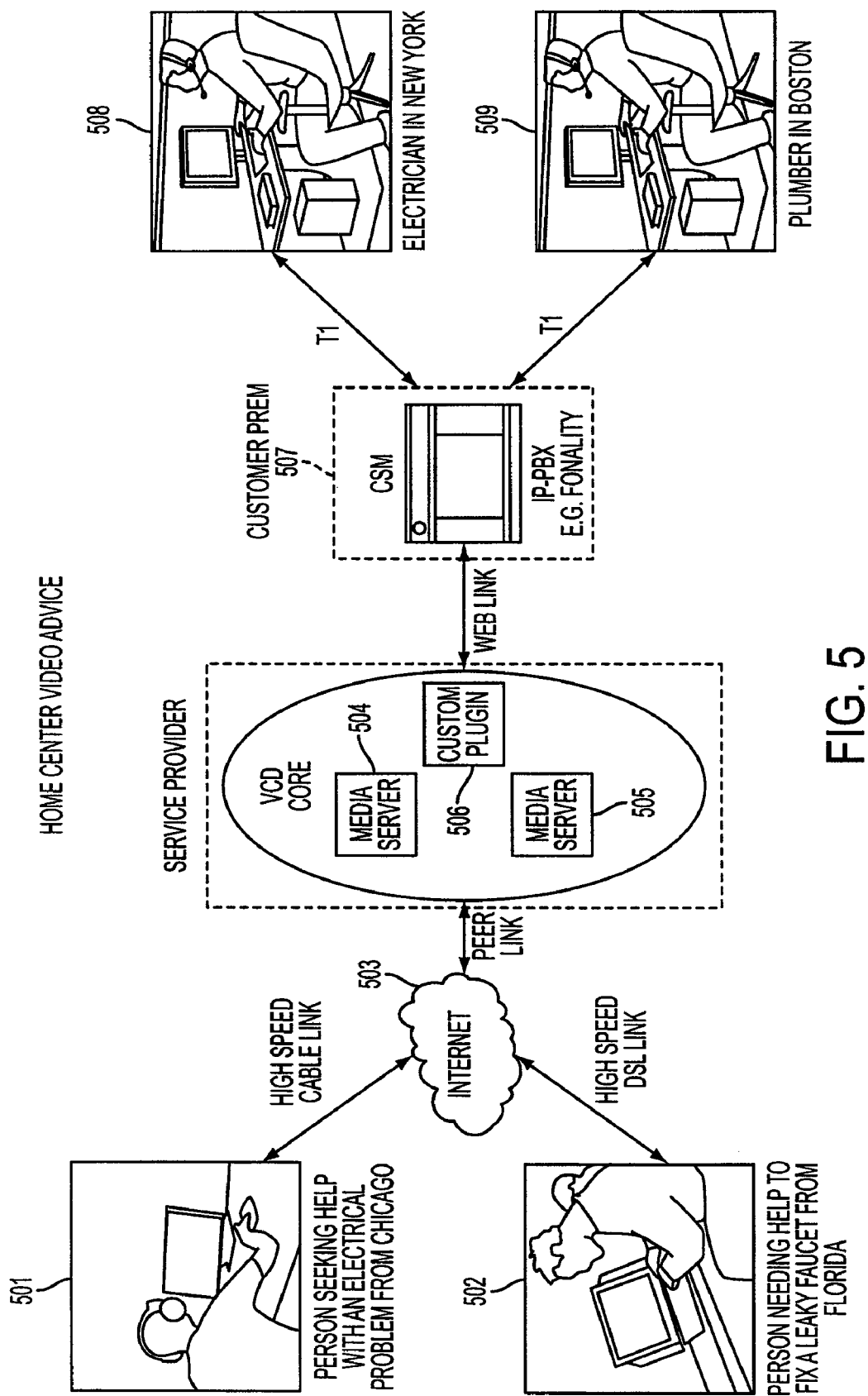
FIG. 5 depicts an exemplary embodiment of the invention in which a VCD system may be used to provide remote service to customers using their home PCs.

FIG. 5 depicts an embodiment in which a user may utilize his home computer to obtain home improvement advice by having a video call directed to a subject matter expert for collaboration.

Figure 3B:
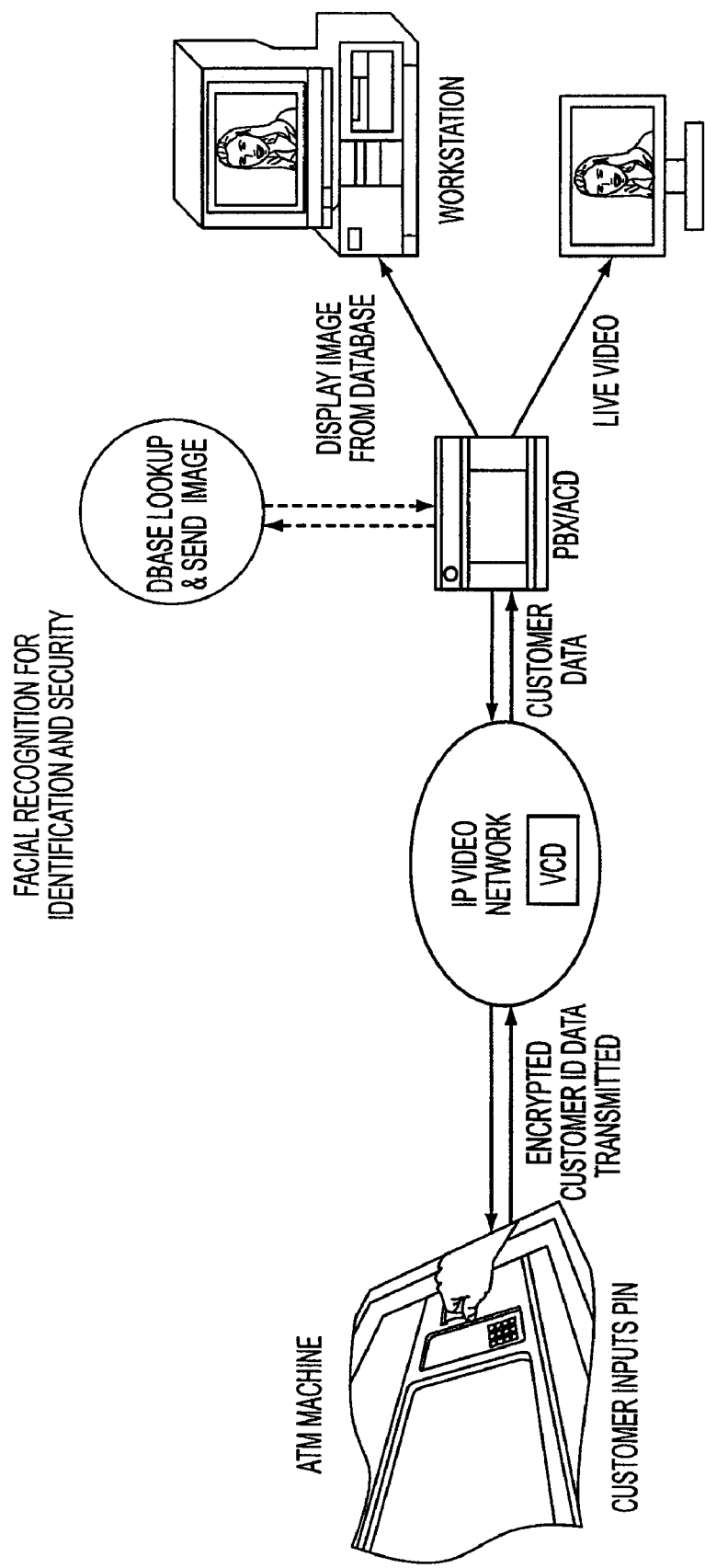
FIG. 3B depicts an exemplary embodiment of the invention, in which facial recognition technology is utilized for identification and security purposes.

In order to enhance the customer experience, various aspects of the invention may take advantage of H.323 videoconferencing technology to provide real-time video communications that will render face-to-face standard and high definition video resolution along with high fidelity audio while operating in a multi-endpoint environment. According to further various embodiments of the invention, the VCD may, among other things, permit visual identification of a caller (e.g., facial recognition or the comparison by the call recipient of a photograph on file) as depicted in FIG. 3B.

Due to the possible sensitive nature of the information being discussed and shared during video communication sessions, the various aspects of the invention may also take advantage of encryption technologies and/or the secure desktop sharing of documents over the same connection. FIG. 3B depicts an exemplary embodiment of the image verification capabilities of the invention.

In the example of a video banking application depicted in FIG. 3A, a prospective bank customer in New York 301 may walk up to, for example, an HD capable video kiosk located in a bank branch for the purpose of applying for a mortgage loan. Alternatively and/or additionally, a customer in Los Angeles 302 may enter a local branch to apply for a credit card, or a prospective customer in London 303 may wish to get information about opening a checking account. Each user may, for example, by pushing a "Call for Service" button, initiate a video call that connects to a H.323 based Media Server system 304 that answers the call and renders either a static or streamed motion video of a menu selection screen to the bank customer. Depending on the kiosk or other initiating device, the customer may either use a keypad, touchscreen, or any device that may generate DTMF tones to a media server in order to make a selection from the menu. The customer may first select a service they would like to discuss with a banking representative, for example information about a mortgage, opening a checking account, or applying for a credit card. Once a selection is made (or prior to the selection), a second tier menu may be displayed to allow the customer to choose between talking to an "English" or "Spanish" speaking agent. Additional menu tiers may be configured if desired for more specific routing trees.

Once the customer finishes making his selections, the routing details may be collected and/or stored by the VCD collector 305. The routing parameters may then be transmitted via the appropriate PBX Control Plugin 306, to the CMS system 307 using, for example, XML protocol. The CMS may then query its skill based routing vector tables to find an available agent that meets the requirements fed to it by the VCD CMS. During this phase, the Multimedia Server plugin 304 of the VCD may present the customer with one or more video presentations while the customer is waiting, such as but not limited to, a video slide with a "Please Hold" message or a streamed commercial video.

Once the PBX system identifies an appropriate agent to handle the customer's request, the CMS may initiate a "Phantom Call" to the agent's phone-set 308, 309, 310 or to a soft-phone if a PC based system is used. The Phantom Call may indicate information about the caller, for example, but not limited to, whether the call is a voice or video call, the branch the call is coming from, and/or the language to be spoken (e.g. English or Spanish).

When an agent answers the call, if it is a video call, the PBX may respond back via the Controller Plugin to the VCD Core with the e.164 or IP address of the agent's video system. The VCD Core may then transfer the video call from the Multimedia Server to the agent's video system 311, 312, 313. At this stage, a two-way video session may be established between the bank customer and video banker agent. The agent may have the ability, by using the phone for call control, to put the customer on hold, which may then trigger the VCD Core to signal the Multimedia Server to display a either a "Please Wait" message or a motion video presentation to the customer while on hold. In addition, the agent may use the phone to transfer the video call if they wish to speak to another agent about a different service. The agent may also start and stop a recording session, if desired, by using a function on the phone. When the call is finished, the agent may hang up the video call the same way they would hang up a voice call, for example, by hitting the "End Call" button on the phone-set. FIG. 3B depicts an alternate embodiment for the video banking application utilizing facial recognition technology for identification and security purposes.

FIG. 4 depicts an exemplary embodiment of the invention in which gourmet food customers seeking advice about wine, cheese, or tea may select one of those subjects from an in-store kiosk. The kiosk may be either standard SD or HD capable in multiple locations. In this example, a customer in New York 401 has a question about a bottle of French wine; a customer in Los Angeles 402 has a question about Napa Valley wines; and a customer in London 403 has a question about Italian cheeses. Upon initiating a session, each customer may be presented a menu by the VCD system components and plugins 404, 405, 406 using the call flow described previously.

The user may make a selection using a keypad or other similar DTMF signaling device. In this example, the CMS 407 may be a shared multi-tenant open-source IP PBX system (for example an Asterisk system) provided and/or maintained by an application service provider (ASP) as part of an overall VCD architecture such as the example system depicted in FIG. 1. Depending on the selection by the customer, and following a similar call flow and processing to that depicted in FIG. 3A, a SD or HD quality video call may be sent to an available agent with the specific skill set desired. In this example, the customer in New York 401 may be connected to a French wine expert in Paris 408; the customer in Los Angeles 402 may be connected to a wine expert in Napa Valley 409 wine, and the customer in London 403 may be connected to a cheese expert in Rome 410.

FIG. 5 depicts an exemplary embodiment of the invention in which the VCD system may be used by a home improvement center to provide a service that allows customers using their home PCs 501, 502 with internet connections 503 to seek assistance with do-it-yourself projects. For example, communicating over video with an electrical expert for assistance with installing a light fixture, or a plumbing expert for instructions to fix a leaking faucet. In this example, VCD may integrate with the home center's existing IP CMS 506, for example a Fonality system, using a custom Control Plugin 507 to enable call control data to be exchanged.

In this example, a PC user with a webcam and a connection to the internet may launch a video call using a third party H.323 pr SIP video client or the user may launch a video session from the home center's web site using an integrated web-based SIP or H.323 video client. As depicted in FIGS. 3A and 4, the VCD elements 504, 505 for call flow, processing, and logic between the VCD Custom Plugin 506 and the CMS 507 may remain the same. The "electrical" 508 or "plumbing" 509 agents in this example may be located in different physical locations and/or may be equipped with SIP soft-phones for call control and/or a PC-based video client. The expert may also be equipped with an SIP IP Phone and/or a H.323 videoconference terminal. The expert may also display installation instructions or conduct a "whiteboard" session with the caller by initiating a data-share session utilizing, for example, H.239 for H.323 video systems or a third party we-conferencing tool like Microsoft Office Communicator System which can integrate with SIP based clients.

While several examples and embodiments of the invention have been described above, the shown examples and embodiments are not intended to limit the scope of the invention. The terms "and" and "or" are understood to be interpreted as inclusive unless such an interpretation is clearly disavowed.

The term "voice-only" is used to describe a system which is not configured to process video communications. The term does not identify how voice data is transmitted or otherwise processed.

We claim:

1. A communication system, comprising:
   a voice-only system configured to provide voice services, the voice-only call system configured to operate independently of the video communication system;
   a video communication system configured to provide video communication services; and
   a video call distributor comprising,
      a plugin configured to transfer data between the video call distributor and the voice-only system, and
      a core configured to receive first commands from the voice-only system and to transmit second commands to the video communication system in accordance with the received commands, such that video communication can be synchronized with voice communication.

2. The communication system of claim 1, wherein the core is further configured to establish a video call over the video communication system based on the first commands.

3. The communication system of claim 1, wherein the core is further configured to process the first commands prior to transmitting the second commands.

4. The communication system of claim 1, wherein the first commands are in a format compatible with the voice-only system, and the second commands are compatible with the video communication system.

5. The communication system of claim 1, wherein the voice-only system is a voice-only call management system, configured to receive incoming voice-only calls and to identify one of a plurality of agents based on user request information provided during the voice-only call.

6. The communication system of claim 5, wherein the user request information is provided via a DTMF signaling device.

7. The communication system of claim 6, wherein the DTMF device is a part of the voice-only call management system.

8. The communication system of claim 6, wherein the DTMF device is a telephone handset.

9. The communication system of claim 6, wherein a menu tree is utilized to provide the user request information.

10. The communication system of claim 1, wherein the plugin is a hardware component.

11. The communication system of claim 1, wherein the plugin is software component.

12. The communication system of claim 1, wherein the core has a distributed architecture.

13. The communication system of claim 1, wherein the voice-only system is a PBX.

14. The communication system of claim 1, wherein the video call distributor resides within a service provider grade IP Packet-Based WAN network.

15. The communication system of claim 1, wherein the video call distributor resides within a private enterprise IP LAN network.

16. The communication system of claim 1, wherein the plugin is configured to transfer data via either an XML or a JAVA call control protocol.

17. The communication system of claim 1, wherein the voice-only system is configured to receive the first commands from a voice-only telephone.

18. The communication system of claim 1, wherein the video call distributer is configured to transfer data between the video communication system and a plurality of voice-only systems.

19. The communication system of claim 1, wherein each of the plurality of voice-only systems has a different format.

20. The communication system of claim 2, wherein the core is configured to determine a recipient of the video call based on a skills-based routing mechanism.

21. A video call system for providing video communication, comprising:
   a voice-only call system configured to provide voice services, the voice-only call system configured to operate independently of the video communication system;
   a video communication system configured to provide video communication services;
   a plugin configured to transfer data between the video communication system and the voice-only call system, and
   a core configured to receive first commands from the voice-only call system and to transmit second commands to the video communication system in accordance with the received commands, such that video communication can be synchronized with voice communication.

22. The video call system of claim 21, wherein the core is further configured to establish a video call over the video communication system based on the first commands.

23. The video call system of claim 22, wherein the core is configured to determine a recipient of the video call based on a skills-based routing mechanism.

24. The video call system of claim 21, wherein the voice-only call system is a voice-only call management system, configured to receive incoming voice-only calls and to identify one of a plurality of agents based on user request information provided during the voice-only call.

25. The video call system of claim 21, wherein a voice-only telephone is used to provide the first commands to the voice-only call system.

26. A video call distributor, comprising:
   at least one plugin configured to transfer data between a video communication system and an at least one voice-only call system, the at least one voice-only call system configured to operate independently of the video communication system and
   a core configured to receive first commands from the at least one voice-only call system and to transmit second commands to the video communication system in accordance with the received commands, such that video communication can be synchronized with voice communication.

27. The video call distributor of claim 26, wherein the core is further configured to establish a video call based on input from the voice-only call system.

28. The video call distributor of claim 26, wherein the core is further configured to receive first commands from a plurality of voice-only call systems.

* * * * *